R. R. BARON.
VARIABLE SPEED DEVICE FOR CYCLES.
APPLICATION FILED AUG. 4, 1919.
1,350,288.
Patented Aug. 17, 1920.
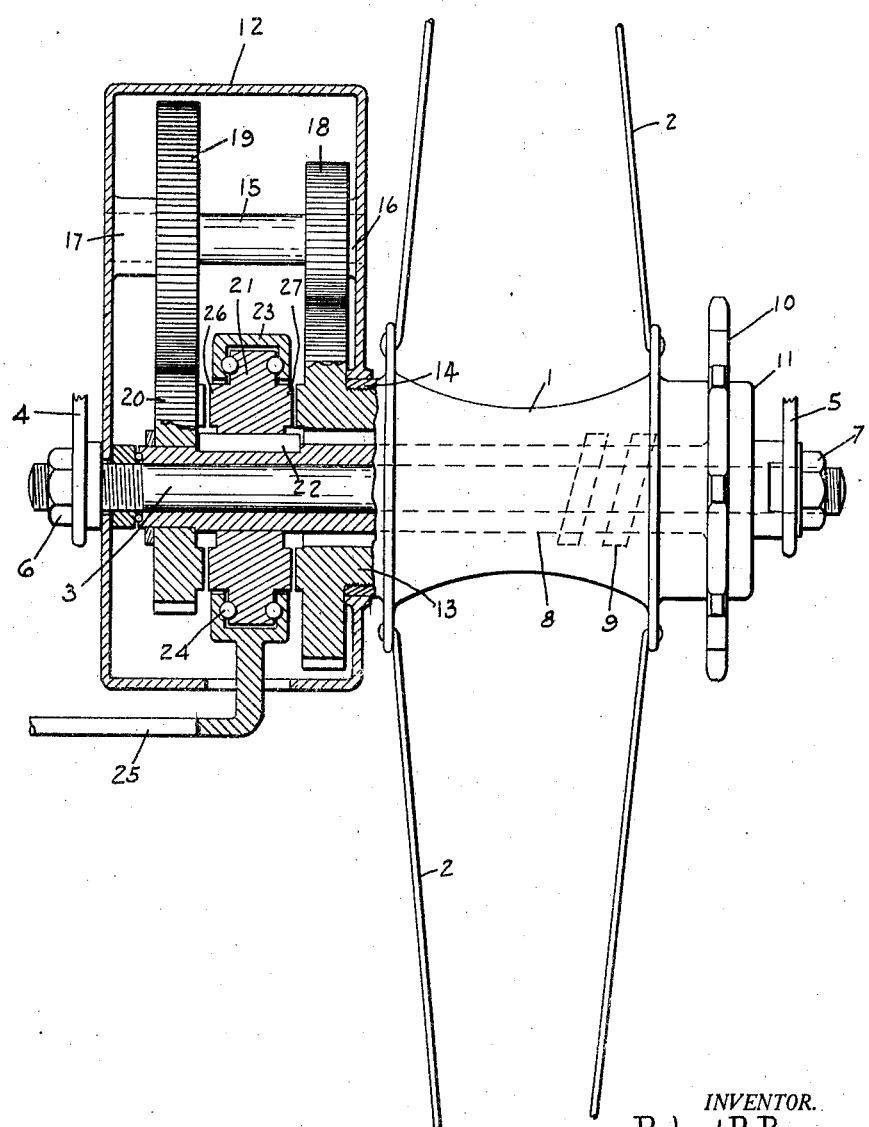
INVENTOR.
Robert R. Baron
BY
ATTORNEYS.

UNITED STATES PATENT OFFICE.

ROBERT R. BARON, OF INDIANAPOLIS, INDIANA, ASSIGNOR, BY DIRECT AND MESNE ASSIGNMENTS, OF ONE-HALF TO GEORGE A. HUG, OF INDIANAPOLIS, INDIANA.

VARIABLE-SPEED DEVICE FOR CYCLES.

1,350,288. Specification of Letters Patent. Patented Aug. 17, 1920.

Application filed August 4, 1919. Serial No. 315,212.

*To all whom it may concern:*

Be it known that I, ROBERT R. BARON, a citizen of the United States, residing at Indianapolis, in the county of Marion and State of Indiana, have invented certain new and useful Improvements in Variable-Speed Devices for Cycles, of which the following is a specification.

This invention relates to cycles, such as bicycles and motorcycles, more especially to means for changing the speed of such cycles at will. Previously, for this purpose there have been used various arrangements attached to the rear wheel of the vehicle, most of which were highly unsatisfactory on account of complicated mechanism, impossibility of ready repair and unreliability of operation. By this invention I obviate these disadvantages, it being among the objects of my invention to produce a device whereby the shifting from high speed to low speed and vice versa may be readily performed and the mechanism for accomplishing which is simple, compact, reliable and easily repaired.

In carrying the objects of my invention into effect I provide a set of gears mounted on the rear of the machine alongside the hub of the rear driving wheel and operatively connected thereto.

Specifically, I provide a set of four gears, one of which is fixed to the hub of the wheel and the others forming a train between which is placed a sliding clutch adapted to engage one or another of such gears to change the speed of rotation of the wheel, the clutch being shifted by a suitable hand operated device.

Referring to the accompanying drawings forming a part hereof and in which similar reference characters denote similar parts the single figure illustrates a view partially in section of my improvement attached to a wheel of a cycle.

The hub 1 of wheel 2 is mounted upon axle 3 which is held at its ends in the fork 4—5 of the frame and locked into place by nuts 6 and 7. Surrounding the stationary axle 3 is a hollow rotatable shaft 8 carrying along one end a coaster brake device 9 of any suitable type, such as is in common use at the present time. Fixed to or mounted on the end of the shaft nearest the coaster brake is a driving sprocket 10 held in place by a lock nut 11.

To the other end of the shaft 8, which is extended for some distance, is attached my new device for changing the speed of the cycle which comprises a casing 12 here shown exaggerated in size in order to more clearly bring forth the structure. A gear 13 mounted loosely on shaft 8 is permanently fixed by lock nut 14 to the hub 1 of the wheel. A shaft 15 is journaled between the ends 16 and 17 of the casing and on said shaft 15 are fixed gears 18 and 19, the gear 18 meshing with gear 13 and the gear 19 meshing with gear 20 also mounted loosely on the hollow shaft 8. These four gears are of such relative diameters that when a certain speed of revolution is imparted to gear 20 its motion will be reduced or slowed down through gears 19, 18 and 13 to give a relatively low speed of the wheel 2.

Between gears 13 and 20 and on the hollow shaft is placed a clutch member 21 having a key therein holding it to the shaft 8 allowing of longitudinal motion relative thereto, but compelling the clutch to revolve with the shaft when it is rotated. A collar 23 surrounds the clutch 21, is preferably ball bearing, as shown at 24, and is connected by bar 25 to any point on the machine to allow of hand shifting of the clutch. The faces of the clutch are formed with teeth 26 and 27 adapted to engage corresponding teeth on the interior faces of gears 20 and 13, respectively, in order to make operative contact between the rotating clutch member and the gears.

In starting, the gear is shifted by a throw of preferably a hand lever so that the clutch engages gear 20, and motion is transmitted through the train of gears to the hub of the wheel the speed having been reduced an amount dependent on the ratio of the gears. When speed has been picked up the bar 25 is shifted so that the clutch engages gear 13 which directly drives the wheel 2. The gears are in this case idling and generally such is the case except when due to a heavy wind or a steep grade or bad road, it is necessary to have more power to propel the cycle without undue expenditure of energy, the clutch is shifted to engage the train of gears and thus produce low speed with corresponding increase of power.

Having thus fully described my said invention, what I claim as new and desire to secure by Letters Patent, is:

1. A variable speed device for cycles comprising an axle, a shaft thereon, a wheel, a gear fixed thereto, a gear loosely mounted on said shaft, reduction gears connecting said gears, a clutch interposed between said first mentioned gears and keyed to said shaft to allow of longitudinal motion of the same, means for shifting said clutch, a sprocket mounted in proximity to said wheel, said sprocket being operatively connected to said shaft.

2. A variable speed device for cycles comprising an axle, a hollow shaft surrounding said axle, a wheel mounted on said hollow shaft, a gear fixed to said wheel, another gear loosely mounted on said hollow shaft, reduction gears connecting said two gears, a clutch-part interposed between said gears and keyed to said hollow shaft, means for sliding said clutch-part longitudinally on said hollow shaft to engage either one of said gears or stand between them free of engagement with either, and means for driving said hollow shaft, substantially as set forth.

In witness whereof, I have hereunto set my hand and seal at Indianapolis, Indiana, this 30th day of July, A. D. nineteen hundred and nineteen.

ROBERT R. BARON. [L. S.]

Witnesses:
H. C. BIERMAN,
M. L. SHULER.